United States Patent [19]

Horoshima

[11] 3,719,930

[45] March 6, 1973

[54] ONE-BIT DATA TRANSMISSION SYSTEM

[75] Inventor: Minoru Horoshima, Kokubunji-shi, Japan

[73] Assignee: Hitachi, Ltd., Tokyo, Japan

[22] Filed: March 25, 1971

[21] Appl. No.: 127,939

[52] U.S. Cl. .......... 340/172.5

[51] Int. Cl. .......... G06f 9/18

[58] Field of Search .......... 340/172.5

[56] References Cited

UNITED STATES PATENTS

| | | | |
|---|---|---|---|
| 3,597,743 | 8/1971 | Murphy | 340/172.5 |
| 3,539,998 | 11/1970 | Belcher | 340/172.5 |
| 3,407,387 | 10/1968 | Looschen | 340/172.5 X |
| 3,413,612 | 11/1968 | Brooks | 340/172.5 |
| 3,504,347 | 3/1970 | Harmon | 340/172.5 |
| 3,508,206 | 4/1970 | Norberg | 340/172.5 |
| 3,512,136 | 5/1970 | Harmon | 340/172.5 |
| 3,544,976 | 12/1970 | Collins | 340/172.5 |
| 3,618,039 | 1/1971 | Baltzly | 340/172.5 |

*Primary Examiner*—Paul J. Henon
*Assistant Examiner*—Sydney R. Chirlin
*Attorney*—Craig, Antonelli, Stewart & Hill

[57] ABSTRACT

A signal transmission system for use in a data processing system employs a plurality of groups of one-bit data sources which are grouped according to priority levels. An address signal is transmitted from a central processing unit to independent groups of controlled signal sources which transmit and receive control signals governing the operation of the system. At individual group stations the address signal is decoded and one-bit sources are accessed. The signals include separate segments or portions made up of pluralities of bits which are employed to identify desired interrupts. bit position of signal portions unnecessary for information transmission are employed to identify the respective one-bit sources requesting interrupt.

22 Claims, 30 Drawing Figures

INVENTOR
MINORU HIROSHIMA
BY
Craig, Antonelli, Stewart & Hill
ATTORNEYS

INVENTOR
MINORU HIROSHIMA
BY Craig, Antonelli, Stewart & Hill
ATTORNEYS

INVENTOR
MINORU HIROSHIMA
BY Craig, Antonelli, Stewart & Hill
ATTORNEYS

INVENTOR.
MINORU HIROSHIMA
BY Craig, Antonelli, Stewart & Hill
ATTORNEYS

INVENTOR
MINORU HIROSHIMA
BY Craig, Antonelli, Stewart & Hill
ATTORNEYS

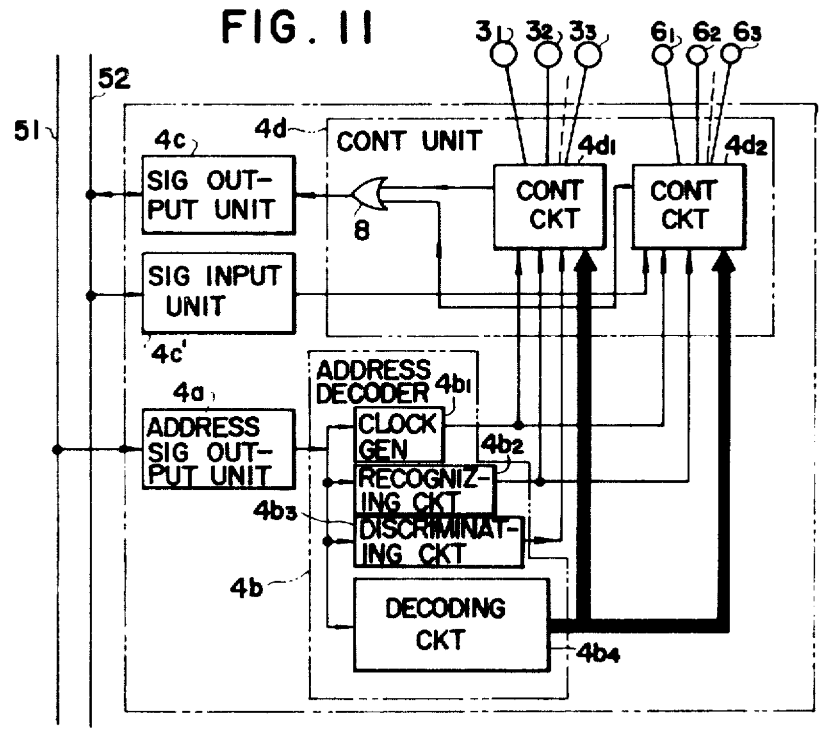
FIG. 11
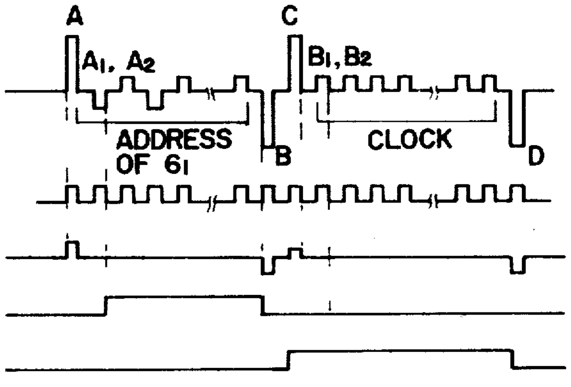
FIG. 12(a)
FIG. 12(b)
FIG. 12(c)
FIG. 12(d)
FIG. 12(e)
INVENTOR
MINORU HIROSHIMA
BY Craig, Antonelli, Stewart & Hill
ATTORNEYS INVENTOR
MINORU HIROSHIMA
BY Craig, Antonelli, Stewart & Hill
ATTORNEYS INVENTOR
MINORU HIROSHIMA
BY Craig, Antonelli, Stewart & Hill
ATTORNEYS INVENTOR
MINORU HIROSHIMA
BY Craig, Antonelli, Stewart & Hill
ATTORNEYS INVENTOR
MINORU HIROSHIMA
BY Craig, Antonelli, Stewart & Hill
ATTORNEYS

ONE-BIT DATA TRANSMISSION SYSTEM

This invention relates to on-off signal transmission systems and more particularly to signal transmission systems capable of transmitting a number of widely distributed one-bit data to the central control room by multiplexing.

For example, the process control applied to a large scale chemical plant is carried out often in such manner that electric signals corresponding to individual process variables are supplied to the central control room from numbers of transducers located in the process field, the given signals are processed by the computer installed in the central room, and the resultant manipulated variables are supplied to the individual actuators whereby the process variables are controlled. In such a control system, the failure of any transducer or actuator must immediately be informed in terms of a signal to the control center to halt the task the computer is executing and to let the computer perform the processing necessary to compensate for failure. When the process is under a sequence control, the control center is to receive a signal notifying of the completion of each control step and give the final operator a necessary manipulated variable for the subsequent step. There are in the process field various factors which may request the computer to halt the task in execution and to get to another task. This service request is effected by a one-bit signal transmitted from a process element to the control center. This signal is normally called an "interrupt signal". The interrupt signal is a one-bit on-off signal. When an interrupt signal is given to the control center, the computer starts executing a programmed task corresponding to the given signal. The kind of task the computer is to execute is determined according to what interrupt signal in the process field causes a service request. In other words, the interrupt signal corresponds to the task to be executed in a one to one relationship.

The interrupt signal in the large scale process control is characterized as follows.

1. The necessary number of interrupt signals must be equal to the number of tasks requested for service at the control center. Practically, the number of interrupt signals is as large as one hundred to several hundred. These interrupt signal sources are distributed widely over the process field.

2. The interrupt signal occurs at random, and its occurrence cannot be predicted. Normally, the interrupt signal occurs infrequently, or the interval between interrupt signals is long.

3. The interrupt signal must receive immediate response. The access time — the time required for the computer to start executing a requested task after arrival of an interrupt signal — must normally be as short as possible. In many process control systems, the access time must be below a certain specific value, or otherwise the computer service becomes useless. The maximum permissible value of the access time differs according to the systems; it is usually 0.1 to 30 seconds. An interrupt signal, when generated, must immediately be detected and processed.

4. There are priority levels assigned to the computer for its execution of tasks corresponding to individual interrupt signals. When several interrupt signals are generated simultaneously, the computer is supposed to take the one with the highest priority level. Assume that an interrupt signal comes in while the computer is executing a task. If the priority level of the task in execution is higher than that of the given interrupt signal, the task corresponding to such interrupt signal is held unexecuted, and the computer continues executing the existing task. Upon completion of the prior task, the computer gets to the task corresponding to the interrupt signal. On the other hand, when the priority level of the task corresponding to the interrupt signal is higher than that of the task in execution, the computer halts the existing task and takes the proposed task. After executing the preferential task, the computer resumes the task which has been held undone. In some cases, the computer does not execute other tasks, but only the task corresponding to a signal of the highest priority level.

The present invention is highly useful when applied to the system wherein interrupt signals of the nature as mentioned above are transmitted to the control center. This invention of course is not limited to this application but makes numerous useful applications available; for example, the invention is effectively applicable to on-off signal transmission.

The objects, features and advantages of this invention will be apparent from the following detailed description when read in conjunction with the accompanying drawings.

Figures 9A, 9B, 9C, 9D:
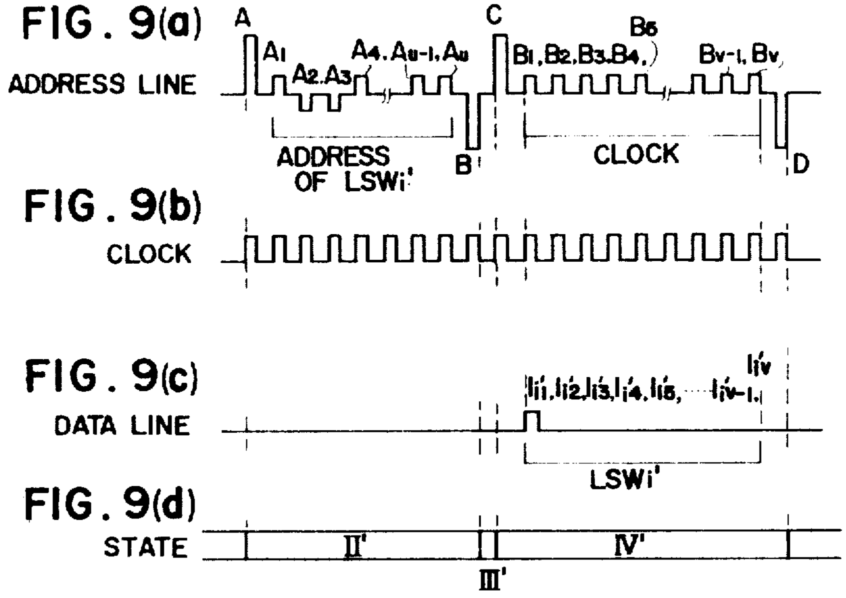
Figure 10:
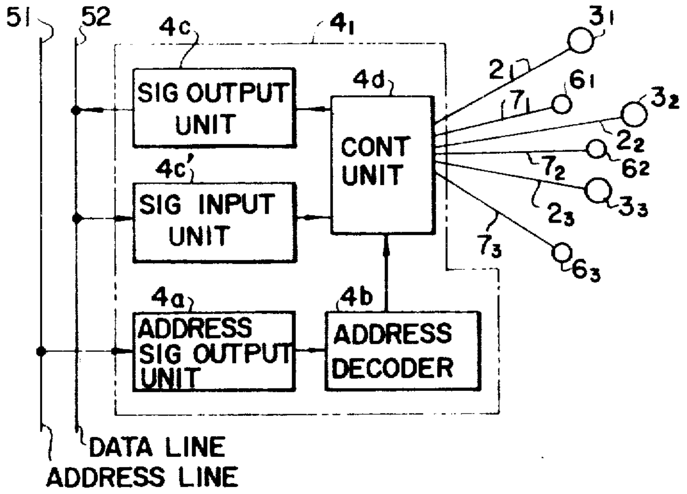
Figure 13:
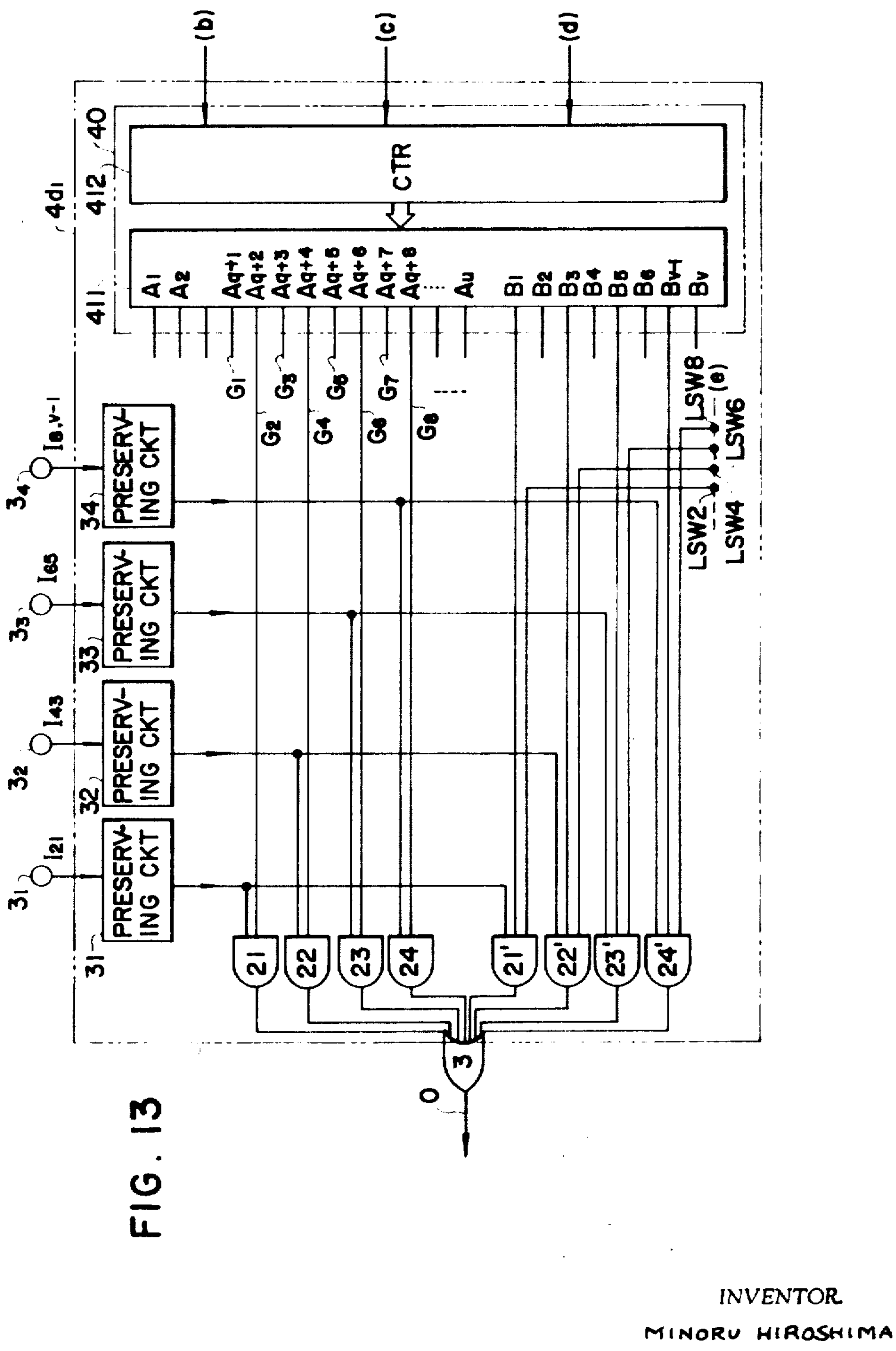
Figure 14:
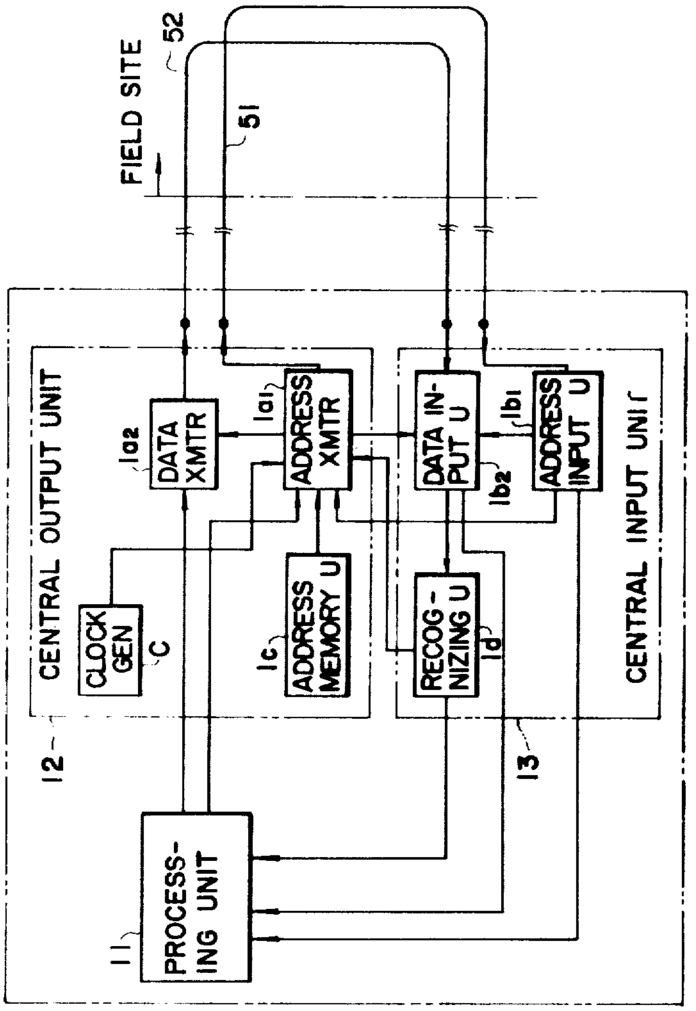
Figure 15:
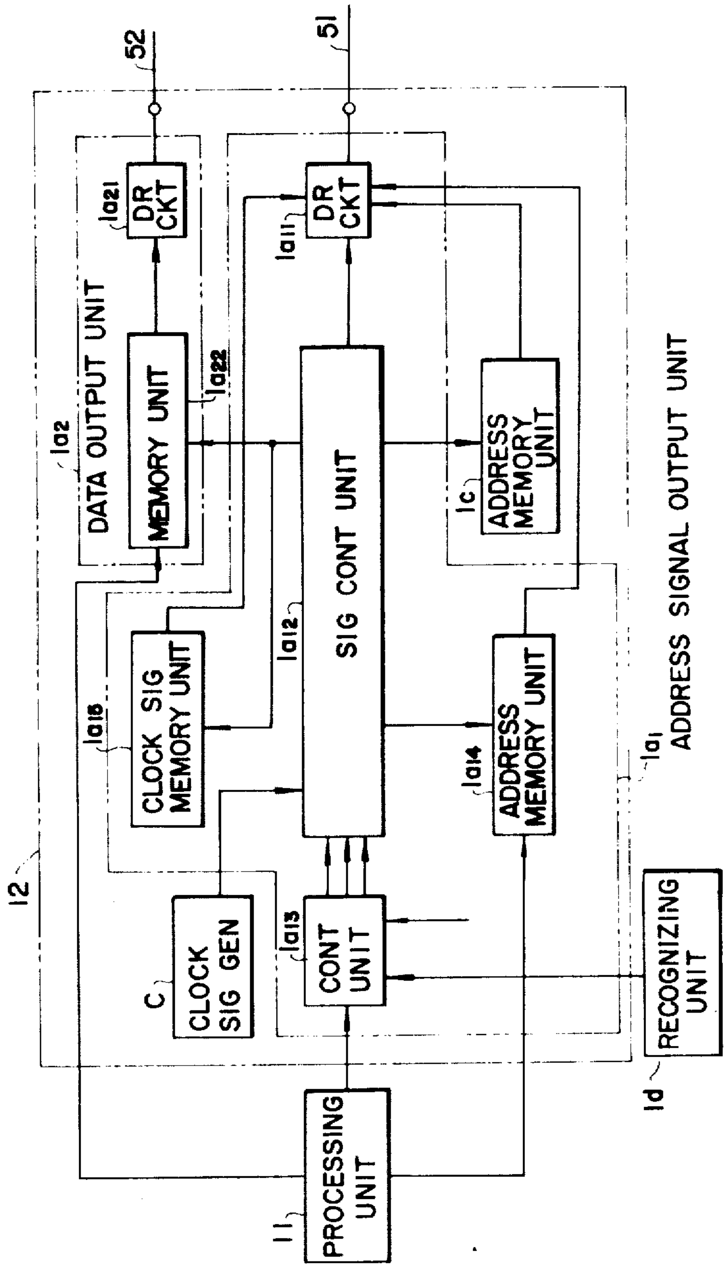
Figure 16:
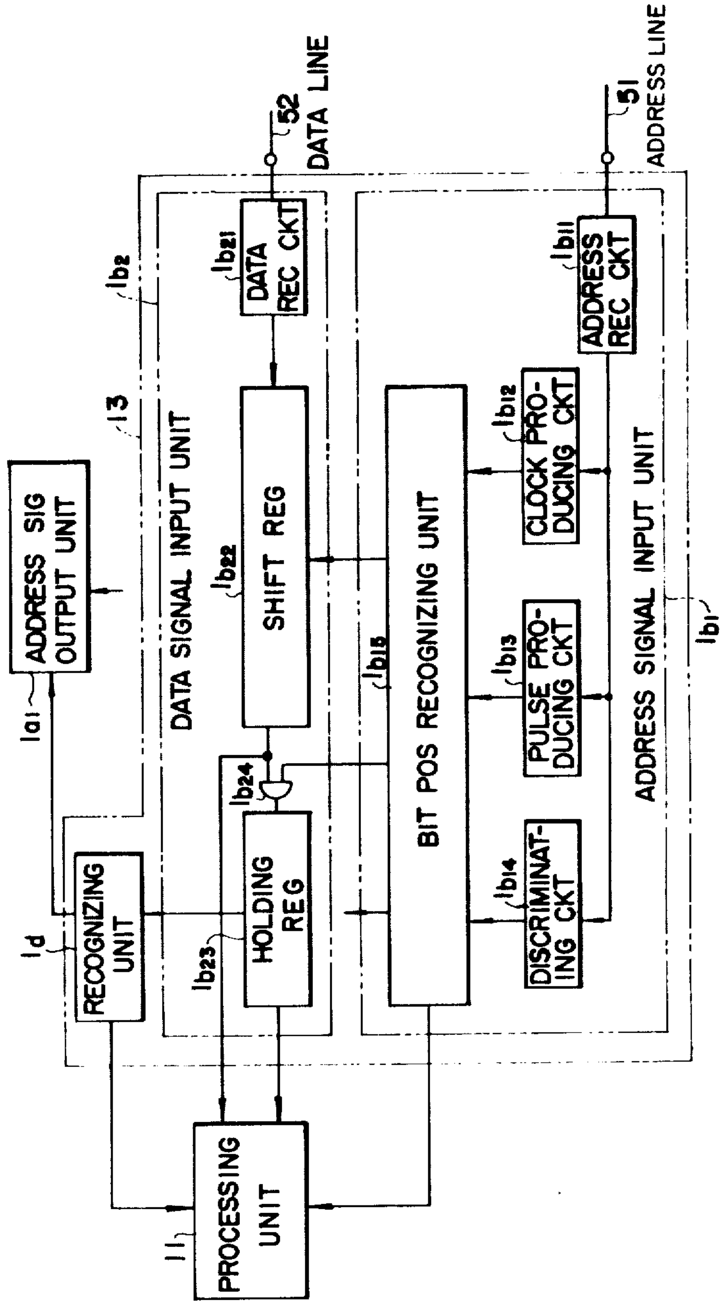

FIGS. 6(a)–(d) through 9(a)–(d) are diagrams showing waveforms of signals used in a system of this invention, FIG. 10 is a block diagram showing an example of station used in a system of this invention, FIG. 11 is a block diagram showing part of a concrete example of station, FIGS. 12(a)–(e) show signal waveforms for illustrating the operation of the station, FIG. 13 is a block diagram showing part of another concrete example of station, FIG. 14 is a block diagram showing an arrangement of the control center, FIG. 15 is a block diagram showing part of a concrete example of arrangement of the control center, and FIG. 16 is a block diagram showing part of another concrete example of arrangement of the control center.

Figure 1:
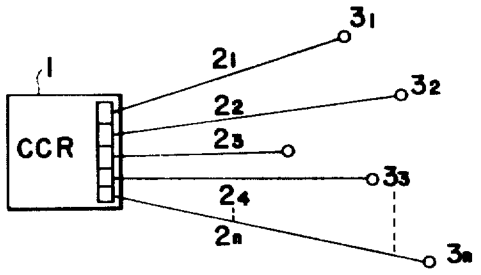
FIGS. 1 and 2 are schematic diagrams illustrating conventional signal transmission systems, FIG. 3 schematically shows a system of this invention.

FIG. 1 shows a conventional signal transmission system in which a number of interrupt signals distributed in the process field are transmitted to the control center. In FIG. 1, the references $3_1$, $3_2$, . . . $3_n$ denote interrupt signal sources, namely, one-bit data sources, $2_1$, $2_2$, . . . $2_n$ transmission channels, and 1 a control center. The interrupt signal sources $3_1$ to $3_n$ are connected to the control center 1 by way of the cleared channels $2_1$ to $2_n$. One or a plurality of interrupt signal sources are comprised in a station consisting of a process signal detector, actuator, signal transducer, etc., or in some cases, interrupt signal sources are distributed independently in the process field. Input/output units, processing unit, etc. are installed in the control center 1. (Further description of equipment installation in the control center will be given later in this specification.)

The signal source in the field which is generating an interrupt signal is detected in the control center in such a manner that the signals sent in through the cleared channels $2_1$ to $2_n$ are applied to the individual input terminals of an $n$-number of registers which, at the same time, are scanned, whereby the status of each register is checked. More specifically, when no interrupt signal is generated from any signal source, the content of the register is supposed to be, for example, "0". The register content becomes "1" only when an interrupt signal is generated. Then, whether or not a "1" is being generated is checked by scanning the registers. If a "1" is detected, the detected signal is transmitted immediately to the processing unit for execution of a programmed task. This transmission system, however, has substantially the following drawbacks.

a. It is necessary to provide each interrupt signal source with a transmission channel. This results in high wiring cost and complicated wiring in the control room. If the number of interrupt signal sources distributed in the process field is more than several hundred, it is nearly impossible to employ this system.

b. As described above, the time interval between interrupt signals is normally long, and the registers are to be scanned at all times to detect an interrupt signal. Practically, the time required for the control center to get to the necessary task after arrival of an interrupt signal is relatively long. For example, in the system shown in FIG. 1, if the register corresponding to an interrupt signal changes its content from "0" to "1" immediately after its being scanned, such status change (namely, occurrence of an interrupt signal) can be detected only in the next scanning cycle.

c. As described above, certain priority levels are assigned to individual interrupt signals. In the system of FIG. 1, if a plurality of interrupt signals are generated simultaneously, all the registers must be scanned to find out the highest priority level signal and to determine the task to be first executed.

Figure 2:
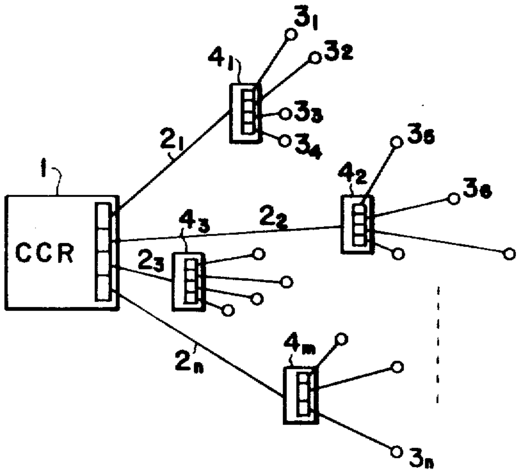

FIG. 2 shows an improved system thereof, wherein mutually adjacent interrupt signal sources distributed in the process field are suitably divided into groups, the interrupt signals of a group are applied in a predetermined sequence to the registers of a station provided for the process field, and one word is constituted of the contents of the individual registers. Each of the stations is connected to the control center by way of a transmission channel, and the registers are scanned in the control center, thus letting the stations transmit interrupt signals in a predetermined sequence.

This system makes some improvements with respect to the aforementioned problems (a) and (b). Namely, when a word provided at each station is composed of $i$-bit interrupt signals, the number of transmission channels can be reduced to $1/i$ in comparison with that in the system of FIG. 1. Also, the access time can be considerably reduced, because when the register scanning speed is assumed to be equal to that in the system of FIG. 1, the time required for one scanning becomes $1/i$. Although improved as above, the system as in FIG. 2 is not desirable for the following reasons.

When the number of stations covering widely distributed interrupt signal sources is increased, the system advantage is offset. While, if the number of stations is decreased, the cost of wiring between the interrupt signal sources and stations becomes high, and the configuration of input/output units of each station is inevitably complicated.

In this system, one station includes interrupt signals of high priority level and low priority level, and these signals indiscriminately set up a word. In other words, the system as in FIG. 2 is not the answer to the foregoing problem (c).

In view of the foregoing, a general object of the present invention is to provide a novel signal transmission system operable free of problems incidental to the prior art.

More specifically, an object of this invention is to provide a signal transmission system capable of transmitting signals from numbers of widely distributed one-bit information sources to the control center via a singular transmission channel.

Another object of this invention is to provide a signal transmission system capable of letting the control center detect quickly whether the signal from an information source is "1" or "0", in a least length of access time.

Another object of this invention is to provide a signal transmission system capable of transmitting signals from distributed information sources to the control center in the order of priority levels.

These and other objects and features of this invention will be better understood upon consideration of the following detailed description and the accompanying drawings.

Figure 3:
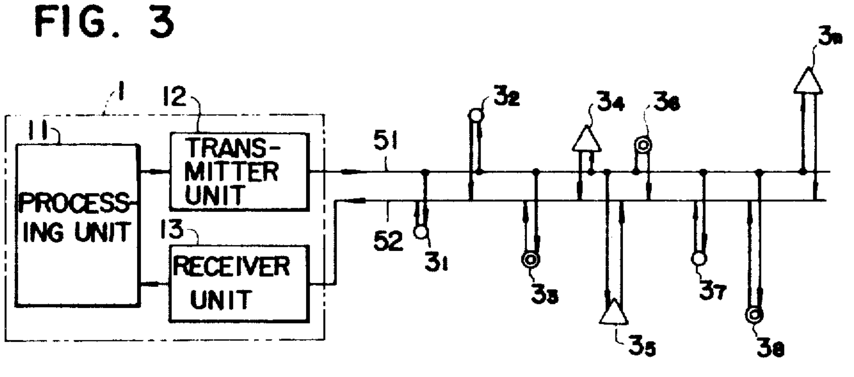

Referring to FIG. 3, there is schematically shown a system of this invention where in a processing unit 11, namely a computer, a transmitter unit 12 and a receiver unit 13 are installed in a control center 1. It is assumed that interrupt signal sources $3_1$ to $3_n$ distributed in the process field have priority levels and are divided into three groups; the highest priority level is assigned to the first group comprising interrupt signal sources $3_3$, $3_6$ and $3_8$, the second highest priority level to the second group comprising $3_1$, $3_2$ and $3_7$, and the remainder priority level to the third group comprising $3_4$, $3_5$ and $3_n$.

An address line 51 and a data line 52 are installed between the control center 1 and process field, and the interrupt signal sources $3_1$ to $3_n$ are connected to their nearest address line 51 and data line 52. Instead of connecting these signal sources in the above manner, it is desirable that the information sources are connected to the transmission lines by way of the nearest stations which are suitably disposed in the process field. (Note: These stations are not shown diagramatically). These stations are installed independent from each other, not as in the system shown in FIG. 2 wherein the interrupt signals of each station make up one word in specific sequence.

One noteworthy feature of the interrupt signal transmission system of this invention is its operation based on address communication in two steps.

In the first step, all the groups to which the interrupt signal sources $3_1$, $3_2$, $3_3$, . . . . belong are checked from the control center 1 as to whether a service is being called for by any group. If any one of the signal sources is found requesting a service, the group comprising such signal source is expressed in terms of "1" state. If no signal sources of the group are calling for a service, this group is held in the "0" state. Then, one word is organized according to the data on all the groups, and this one word data is supplied to the control center via a date line.

In the second step, the address signal of a "1" state group (namely, the service requesting group) is sent to the control center. Each interrupt signal source generates a "1" signal when requesting service, or a "0" signal when requesting no service. The group comprising a "1" or "0" signal source forms a word, which then is transmitted to the control center, whereby the interrupt signal of the group being in the "one" state or is calling for an interrupt is detected.

In short, the present invention is characterized in that the first step operation for transmitting group data to the control center and the second step operation for transmitting thereto the data on the interrupt signal sources of only the group in a "1" state are executed, whereby one requesting a service is detected from among many interrupt signal sources distributed in the process field.

In the above system, the group data obtained in the first step is hereinafter referred to as interrupt request data or IR data, and the data obtained in the second step is called level data or LS data.

Figure 4:
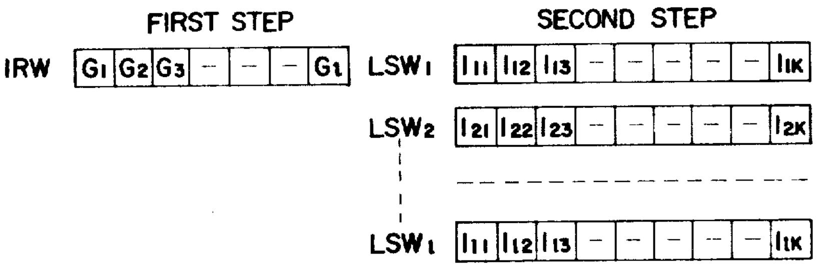
FIG. 4 illustrates the basic principle of this invention.

The fundamental idea of this invention will become clear from the following description with reference to FIG. 4.

It is assumed that the interrupt signal sources distributed in the process field are divided into an $l$-number of groups in the order of priority levels from high to low such as $G_1, G_2, G_3, \ldots Gl$. K-number of interrupt signal sources are comprised in each of the groups. $I_{11}, I_{12}, I_{13}, \ldots, I_{1K}$ represent the interrupt signals of group $G_1$, and $I_{l1}, I_{l2}, I_{l3}, \ldots I_{lK}$ the interrupt signals of Group $G_l$. It is assumed that the smaller the number of suffix to I, the higher an interrupt signal has its priority level in one group. For example, the order of priority level in group $G_1$ is $I_{11}>I_{12}>I_{13}> \ldots >I_{1K}$. In the usual process control system, l is 8 to 32, K is about 16, the total number of interrupt signals (namely, the total number of tasks to be dealt with in the control center) is one hundred to several hundred.

A signal transmission system of this invention is operated in the following manner. In the first step, a word IRW, expressing a group data as shown in FIG. 4, is transmitted to the control center 1. When all the group data are "0", namely when $G_1 + G_2 + G_3 \ldots + G_l = 0$, the first step operation is repeated. When $G_1 + G_2 + \ldots G_l = 1$, for example, when $G_2 = 1$, a word LSW 2 expressing a level data of the second group is transmitted to the control center in the second step. When, for example, $G_1$ and $G_3$ are both "1" in the first step, $LSW_1$ is first transmitted and then $LSW_3$ is transmitted to the control center. When only the "1" state interrupt signal of highest priority level is transmitted in the event a plurality of interrupt signals are generated simultaneously, $LSW_1$ is transmitted thereto in the second step and then the first step communication is performed again.

A system of this invention applied to a process control is operated in the following manner. In this system, three kinds of signals are used for transmission between the control center and process field. One signal is called a manipulated variable transmitted from the control center to the actuator which is to control the process variable. This communication will hereinafter be referred to as manipulated variable transmitting communication. Another signal is called a sensor signal detected by the process variable detector. This signal corresponds to the detected variable. The communication for sending this signal to the control center will hereinafter be referred to as sensor signal receiving communication. The sensor signal and manipulated variable together will be referred to as a control signal, and the manipulated variable transmitting communication and sensor signal receiving communication together will be called control communication. The third one is a signal of one-bit data, called an interrupt signal, transmitted from an interrupt signal source to the control center. This communication will be referred to as interrupt communication. The interrupt signal and control signal together will be called a data signal, and the interrupt communication and control communication together will be termed a data communication.

Figure 5:
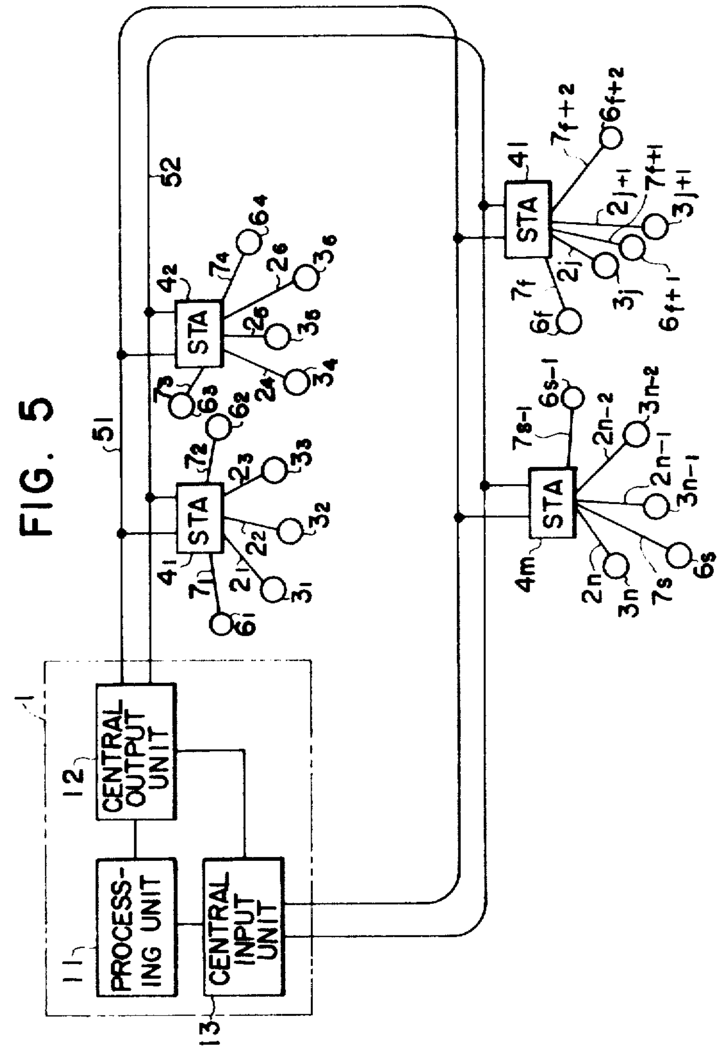
FIG. 5 is a block diagram showing a system of this invention.

FIG. 5 is a block diagram showing a system of this invention. In FIG. 5, a processing unit 11, a central output unit 12 and a central input unit 13 are installed in the control center 1. Stations $\mathbf{4_1, 4_2 \ldots 4_m}$ are suitably distributed in the process field. Interrupt signal sources $\mathbf{3_1, 3_2, \ldots, 3_n}$ and control signal input/output units $\mathbf{6_1, 6_2, 6_3, \ldots, 6_r}$ are connected to an address line 51 and data line 52 by way of the stations $\mathbf{4_1, 4_2, \ldots 4_m}$. In the system shown in FIG. 4, the address line and data line from the output unit 12 of control center 1 are connected to the stations and then to the input unit 13 whereby a closed loop is formed.

It is desirable that the address signal and data signal transmitted through the foregoing transmission lines are a serial type of PCM signal. To this end, a clock signal generator is provided in the control center, and the address signal and data signal are all synchronized with the clock when transmitting and receiving these signals.

Figures 6A, 6B, 6C, 6D:
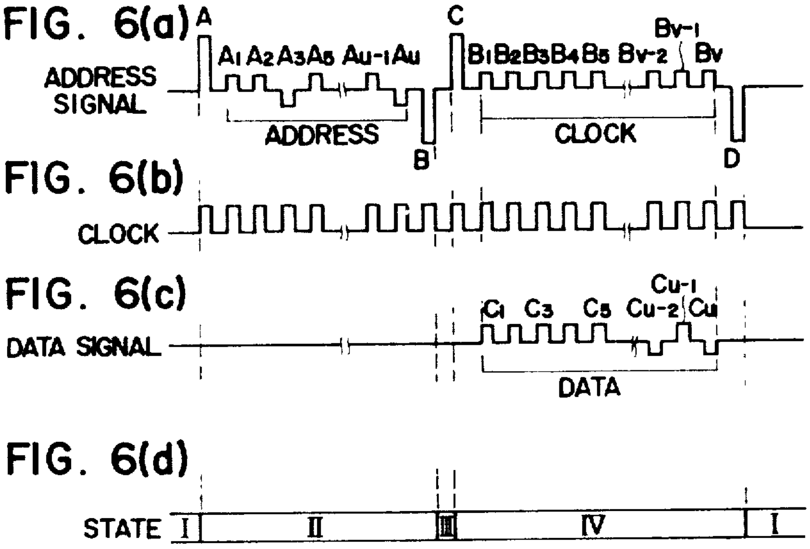

FIGS. 6(a)–6(d) depict a time chart showing a signal on the address line and a signal on the data line in a control communication, which signals are obtained at the central input unit. An example of the format of an address signal is shown therein. It is apparent that the address signal is not limited to this format. In FIG. 6(a), A is a start pulse indicating the beginning of an address pulse signal, B an end pulse indicating the end of the address pulse signal. $A_1, A_2, \ldots A_u$ denote bits which are to form a word expressing an address pulse signal, and the length of one word is $u$-bits. In this example, the amplitude of the index of the start pulse is large in the positive direction, and that of the end pulse is large in the negative direction. Instead, other suitable indexing methods may be employed where, for example, a pulse width or code is utilized. C denotes a start pulse indicating the beginning of a clock pulse signal used for transmission and reception of data signals between the input/output units of a station and the control center, D an end pulse indicating the end of the clock signal; the length of the clock signal is V bits made up of bits $B_1, B_2 \ldots B_v$ which form a clock signal. The format of the address signal is such that a positive pulse indicates a "1"

state, and a negative pulse a "0" state. In this example, an address 1101 . . . 10 is shown and *u* is not necessarily equal to *v*. However, it is desirable that *u* be equal to *v* in a system wherein the processing unit of the control center comprises a computer. FIG. 6b shows a clock pulse signal composed of signals on the address line in each station. To obtain this clock pulse signal, therefore, there must be present pulses at the bit positions A, $A_1, A_2, \ldots A_u$, B, C, $B_1, B_2, \ldots B_v, \ldots$, D of signals on the address line. Their polarities and amplitudes, etc. may be arbitrarily determined. FIG. 6(c) shows a data signal, which is synchronized with the clock pulse signal for transmission through the data line.

Such a data signal can be considered as a signal used in the following transmission system. For example, one or plural number of process detectors or actuators $6_1$, $6_2$ . . . $6_x$ belonging to the stations distributed in the process field are designated from the control center 1 and an address as in FIG. 6(a) is transmitted. By this, the designated station regenerates a clock as in FIG. 6(b) from the given address. At the same time, the detector corresponding to the address signal sends to the control center a data signal as in FIG. 6(c), synchronized with the foregoing clock.

The communication of the sensor signal and the manipulated signal has been described above. The communication of the interrupt signal will be described below.

The control communication is classified into four states as shown in FIG. 6(d). Namely, I is the noncommunicating state, II the state of address signal transmission, IV the state of data signal transmission, and III the non-communicating state indicating the state between II and IV. As shown in the signal time chart in FIGS. 6(a)–6(d), a signal is transmitted through the data line only in the IV state, and the data line is vacant in the states I, II, and III. In other words, an interrupt communication can occur in the state of I or II without disturbing the control communication.

In the system of this invention, the first step of interrupt communication, namely the communication for transmitting the group data IRW of an interrupt signal source is carried out by utilizing the I or II state.

Figures 7A, 7B, 7C, 8A, 8B, 8C:
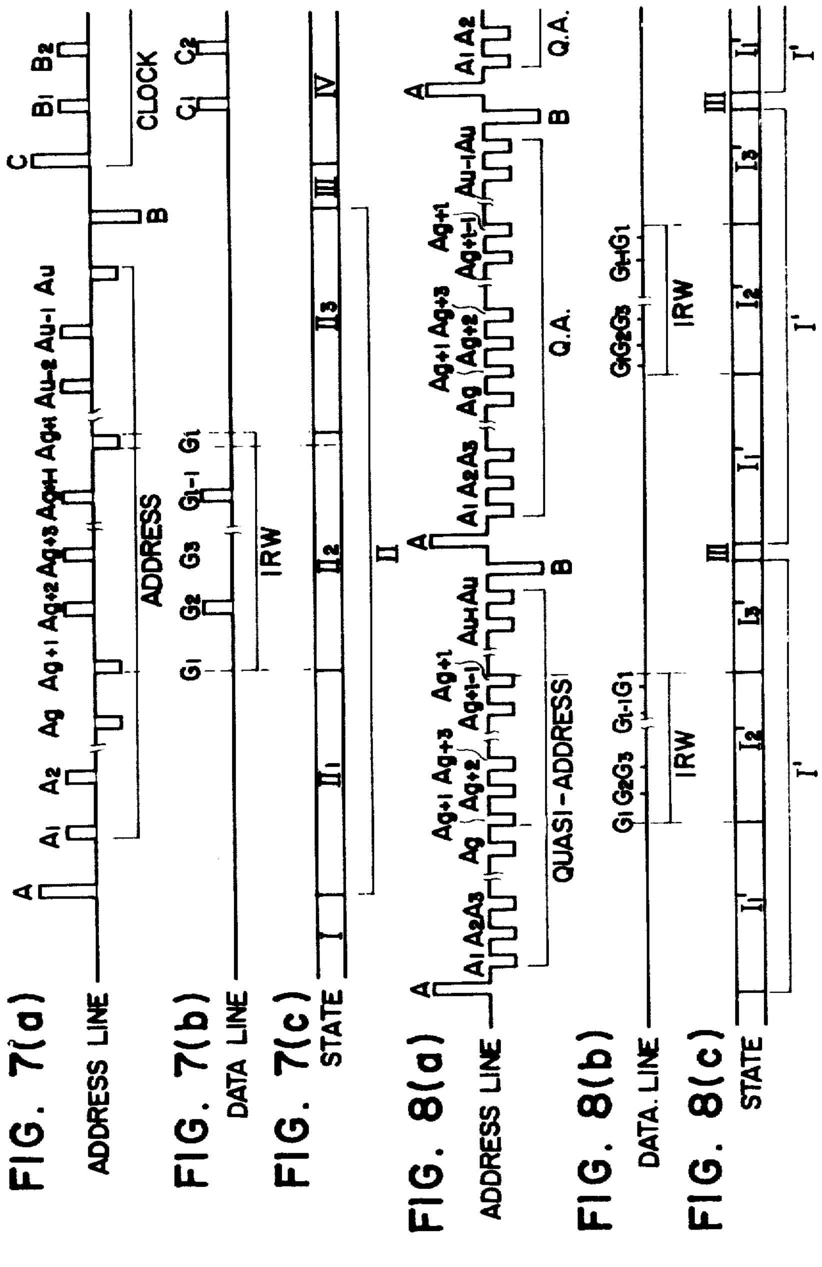

FIGS. 7(a)–7(c) represent a time chart showing signals used for IRW interrupt communication in the state II. Namely, bits $G_1$ through $Gl$ of IRW are on the data line at positions $A_q + 1$ through $A_q + l$ of the address signal of a control communication. In this case, IRW may be placed in arbitrary bit positions of the address signal. FIG. 7(b) shows an example of IRW wherein interrupt signals are generated at the priority levels $G_2$ and Gl-1. The signal format of IRW and LSW of interrupt communication is determined in such manner that "1" and "0" states are expressed by presence and absence of a pulse, and the polarity of the pulse is positive.

When an interrupt signal of a certain station is in the "1" state, the corresponding station sends out a pulse to the bit position of an address signal corresponding to the priority level of the given interrupt signal whereby an IRW as shown in FIG. 7(b) is obtained.

The above-mentioned I state is the state where no control communication is performed. In this state I, the central transmitter unit of the control center 1 transmits continuously a quasi-address signal (hereinafter briefly, QA) of IRW interrupt communication to the address line. In this state, it is so arranged that no data signal corresponding to QA is delivered as in the case of a clock signal. In other words, QA is an inhibit address against data signals. FIGS. 8(a)–(c) show is a time chart showing an example of operation using negative pulses wherein the groups $G_1$ through $Gl$ of IRW come in the bit positions $A_q + 1$ through $A_q + l$ of QA.

In the interrupt communication of IRW utilizing the I state, the central output unit of the control center repeatedly transmits QA automatically. This state is indicated by I' in FIG. 8(c).

Usually, the interrupt communication of IRW is performed by other than the processing unit 11 installed in the control center 1. The IRW communication of the first step is repeated as far as all the groups $G_1$ through $G_l$ which form IRW are in "0" state. When $G_1 + G_2 + G_3 + \ldots G_l = 0$, the processing unit is notified of the generation of an interrupt signal, and searches the bit $G_i'$, which is in the state "1" standing at the highest priority level in IRW. After this operation, the second step communication, namely the interrupt communication of $LSW_i'$ is executed by the instruction of the processing unit.

In the above manner, IRW communication is performed automatically via the central input/output units, and LSW communication is executed under the control of the processing unit. It is noted that this system is an example and illustrative only. For example, IRW analysis and LSW communication control may be done by the central input/output units. Also, interrupt communication may be controlled by the processing unit of the control center.

FIGS. 9(a)–(d) are time charts illustrating an example of communication of $LSW_i'$, with reference to the time chart shown in FIGS. 6(a)–(d). This communication is performed in nearly the same manner as the control communication. More specifically, the central output unit sends 9(a) an address signal of LSW*i'* (FIG. 9(a)) to the address line and then sends out a clock signal. This clock signal is of inhibit address form. It is so arranged that no data signal is given in correspondence to this clock signal. Each station of the process field provides a clock pulse as in FIG. 9(b) from signal in FIG. 9(a) and sends out a signal in FIG. 9(c) of the interrupt signal source having priority level *i'* to the data line, synchronized with the clock pulse in FIG. 9(b). In FIG. 9(c), the signal on the data line is expressed in terms of interrupt signals $Ii'_1, Ii'_2, \ldots, Ii'_v$ of which $Ii'_1$ is in the "1" state and all others are in the "0" state. $Ii'_1$ corresponds to clock $B_1$, $Ii'_2$ to $B_2, \ldots, B_v$ to $Ii'_v$, and the pulse signal comes in $B_1$ bit position.

Concrete examples of units installed in the station of the process field and in the control center will be described below.

Station

Referring to FIG. 10, there is shown schematically a station indicated by the reference $\mathbf{4}_1$, comprising an address signal input unit 4*a*, an address decoder 4*b*, a signal output unit 4*c* for transmitting the sensor signal and interrupt signal over a data line 52, a signal input unit 4*c'* for receiving a manipulated variable signal transmitted through the data line 52, and a control unit 4*d* for controlling the signal input and output units 4*c* and 4c'. The references $3_1$, $3_2$, $3_3$ . . . denote interrupt signal sources connected to said control unit 4d by way of cleared channels $2_1$, $2_2$, $2_3$, . . . respectively. Controlled objectives (controlled signal sources) $6_1$, $6_2$, $6_3$, . . . are connected to said control unit 4d by way of cleared channels $7_1$, $7_2$, . . . respectively.

FIG. 11 illustrates the decoder 4b and control unit 4d shown in FIG. 10. The address decoder 4b comprises a clock regenerator circuit $4b_1$ for producing a clock pulse from the signal which is sent through the address line 51, a circuit $4b_2$ for recognizing start pulses A, C and end pulses B and D, a circuit $4b_3$ for discriminating between the address signal and clock signal transmitted through the address line 51, and a circuit $4b_4$ for decoding which signal source, the interrupt signal source or control signal source, the address signal corresponds to.

In FIGS. 12(a) – 12(e), when an address signal present between the start pulse A and end pulse B, and a clock pulse present between the start pulse C and end pulse D (shown in FIG. 12(a)) are sent through the address line 51, the circuit $4b_1$ generates a clock as in FIG. 12(b). The circuit $4b_2$ generates a pulse as in FIG. 12(c) from the signal in FIG. 12 (a), and the discriminating circuit $4b_3$ forms a signal shown in FIG. 12 (d). The decoder $4b_4$ decodes an address signal of FIG. 12 (a), and supplies a signal of FIG. 12 (e) only to the channel, for example, $6_1$ when the address is that of $6_1$.

The control unit 4d comprises a control unit $4d_2$ operated for control signal communication and a control unit $4d_1$ operated for interrupt signal communication. The foregoing signals FIGS. 12 (b), 12 (c) and 12 (e) are applied to the control units $4d_1$ and 12 (d) $d_2$, and the signal of FIG. 12 (d) to the interrupt communication control unit $4d_1$. The manipulated variable given to the input unit 4c from the control center is applied to the control communication control unit $4d_2$. The interrupt signal from $4d_1$ and the sensor signal from $4d_2$ are applied to the output unit 4c through an OR gate 8 and transmitted over the data line 52.

FIG. 13 shows a concrete example of interrupt communication control unit $4d_1$.

In FIG. 13, one-bit interrupt signals from the interrupt signal sources $3_1$, $3_2$ $3_3$, . . . are applied to interrupt generating status preserving circuits 31, 32, 33, . . . respectively. The preserving circuits 31, 32, . . . normally generate a "0" output. When an interrupt signal is generated, only the preserving circuit to which the corresponding interrupt signal source is connected generates a "1" output. This preserving circuit holds the "1" state until it is reset. The outputs of the individual preserving circuits are applied to AND gates 21, 22, 23, . . . and 21', 22', 23', . . . respectively. The AND gates 21, 22, 23, . . . are necessary for group data communication, namely IRW communication, and the AND gates 21', 22', 22', 23', . . . for LSW communication. The outputs of all the AND gates are applied to an OR gate 3.

The clock pulse (b), start and end pulse signals (c) and discriminating signal (d) of clock signal and address signal are applied to a bit position recognizing unit 40. This unit 40 is to recognize the bit positions $A_1$, $A_2$, $A_3$, . . . $A_u$ of the address signal and also the bit positions $B_1$, $B_2$ $B_3$ . . . $B_v$ of the clock signal. This unit 40 comprises , for example, a counter 412 and a decoder 411. The counter 412 is actuated by the start pulse (c) to start counting the clock pulse (b). The counting is terminated by the end pulse (c) , and the counter is reset. The decoder 411 has ( $u + v$ ) -number of output lines for bit positions $A_1$ through $A_u$ and $B_1$ through $B_v$. The decoder 411 generates a signal to $A_1$ through $A_u$ when the signal sent via the address line 51 is an address signal, or to $B_1$ through $B_v$ when it is a clock signal. In FIGS. 12 and 13, the bit positions and the output lines of decoder 411 are indicated by the common references. When the signal from the address line 51 is an address signal, the decoder 411 is operated in the following manner. When the count value of the counter 412 is 1, a "1" signal is delivered from $A_1$ of the decoder 411. When it is 2, the decoder generates "1" signal from its $A_2$ terminal. When it is $u$, the decoder generates $l$" signal from its $A_u$ terminal. When the signal sent via the address line 51 is a clock signal, the decoder 411 generates a "1" signal from one of its terminals $B_1$ to $B_v$ corresponding to the value of the counter 412. As will be apparent from FIGS. 7 and 8, the group data of the interrupt signal, namely the groups $G_1$ through $Gl$ of IRW correspond to the bit positions of $A_q + 1$ through $A_q + l$ of the address signal, respectively.

For explanatory simplicity it is assumed that the priority level of interrupt signal sources $3_1$ is 2, and this signal source $3_1$ is the No. 1 signal source in the same priority level group, and its signal is expressed by $I_{21}$. It is assumed also that the priority level of $3_2$ is 4 , the signal source thereof is No. 3 in the same priority level group, and its interrupt signal is $I_{43}$. Similarly, the priority level of 33 is 6, the signal source thereof is No. 5, and the interrupt signal is $I_{65}$. Also, the priority level of $3_4$ is 8, the signal source is No. $(v-1)$, and the interrupt signal is $I_8$ $(v-1)$. In such a case, the output $A_q+2$ at the bit position corresponding to the group data $G_2$ of priority level 2, together with the output of the preserving circuit 31, are applied to AND gate 21. Similarly, the output $A_q + 4$ at the bit position corresponding to the group data $G_4$ of priority level 4 and the output of the preserving circuit 32 are applied to an AND gate 22. The signal of $A_q + 6$ and the signal of signal source $3_3$ of priority level 6 are applied to an AND gate 23. Also, the signal of $A_q + 8$ and the signal of signal source $3_4$ of priority level 8 are applied to a gate 24. In this manner, the AND gates 21 through 24 are given the signal from the interrupt signal preserving circuit 31 through 34 and also the signals among $A_1$ to $A_u$ of the bit positions of the address signal corresponding to the priority level of said interrupt signal. When the outputs of the interrupt signal preserving circuits 31, 32, . . . stand at the same priority level, it is apparent that the signals among $A_1$ to $A_u$ applied to the AND gate to which said same priority level signals are supplied are the same.

The following input signals are applied to the AND gates 21', to 24', which are used for LSW communication.

As described by referring to FIG. 12, when the address signal from the control center corresponds to the $LSW_i$, the decoder delivers a signal "1" to only the line corresponding to the $LSW_i$ for the duration between the start pulse C and end pulse of the clock signal as shown in FIG. 12 (e). This signal LSW2 is applied to the AND gate 21'. Similarily, the signals LSW4, LSW6 and LSW8 generated from the decoder $4b_4$ corresponding to the addresses of $3_2$, $3_3$ and $3_4$ are applied to the AND gates 22', 23' and 24' respectively. In this example of operation, the priority levels of $3_1$, $3_2$, $3_3$ and $3_4$ are assumed to be 2, 4, 6, and 8, respectively. Accordingly, the outputs of the decoder $4b_4$ are expressed by LSW2, LSW4, LSW6 and LSW8, respectively. The signals from the decoder 411 are applied to the AND gates 21' to 24', the signal of $B_1$ bit position to 21', the signal of $B_3$ bit portion to 22', the signal of $B_5$ bit position to 23', and the signal of $b_{\nu-1}$ to 24'.

One specific station of the process field has been described above. Other stations are arranged in the same manner.

Operation of a Station

The stations as shown in FIGS. 10, 11 and 13 will be described below.

1. Communication of Control Signal

The sensor signal is transmitted from an arbitrary one of the controlled objectives, for example, $6_3$ to the control center in the following manner. First, the address corresponding to $6_3$ and clock signal as shown in FIG. 6 (a) are sent out from the control center via the address line. The station $4_1$ receives this signal, and the decoder $4b_1$ decodes that this signal is of address of $6_3$. The decoded signal is sent to the control communication control unit $4d_2$. At the same time, the circuit $4b_1$ produces a clock as in FIG. 6 (b) from the signal sent through the address line. The circuit $4b_2$ extracts the pulses A, B, C and D and sends these pulses to said control unit $4d_2$. The control unit $4d_2$ is operates so that the sensor signal from the controlled objective $6_3$ is derived from the signal of decoder $4b_4$. The derived signal is quantized and synchronized with the clock pulse present between C and D and then is transmitted as a data to the control center via the data line.

A manipulated signal is transmitted from the control center to a controlled objective, for example, $6_3$, in the following manner. An address signal as in FIG. 6 (a) is transmitted over the address line, and a data signal as in FIG. 6 (c), which is the quantized manipulated signal, is sent over the data line. In the station $4_1$, the circuit $4b_4$ decodes the address signal to find that this signal has the address of $6_3$. The decoded signal is supplied to the control unit $4d_2$. On the other hand, the manipulated signal transmitted through the data line 52 is given to the control unit $4d_2$ by way of the input unit $4c'$ and then is applied to the controlled objective $6_3$ which has been selected by the address signal.

2. Communication of Interrupt Signal

This communication can be considered in two forms; IRW communication and LSW communication. As described above, IRW communication can be done with control communication. An example of operation wherein IRW communication is performed in the state II in the control communication ( namely, during address signal transmission ) will be described below.

As is described , when an address signal as in FIG. 12 (a) comes in, the circuits $4b_1$, $4b_2$ and $4b_3$ generate the signals in FIGS. 12 (b), 12 (c) and 12 (d). When the interrupt signal sources $3_1$ and $3_2$ among $3_1$, $3_2$, $3_3$ and $3_4$ are requesting interrupt, or generating "1" signals, and $3_3$ and $3_4$ are generating "0" signals, then these signals are preserved by the state preserving circuits 31, 32, 33 and 34 in "1", "1", "0" and "0" states respectively.

Meanwhile, the counter 412 counts the pulses present between the start pulse A and end pulse B. When the count value reaches $q + 2$, a pulse is delivered from $A_q + 2$ terminal of the decoder 411. The $( q + 2)$ th pulse passes through the gate 21 since a "1" signal is being applied to this AND gate 21 from the preserving circuit 31. The ( q + 2 ) th pulse is further passed through the OR gate 3 and sent out over the data line 52. Namely, a "1" signal is obtained on the data line at the same time as in the ( $A_1 + 2$ ) bit position, as shown in FIG. 7 (b). In the same way, when the count value of the counter 412 reaches q + 4, a pulse is delivered from the terminal $A_q + 4$ of the decoder 411. This pulse is passed through the AND gate 22 and OR gate 3 and then is sent out over the data line 52. Namely, a pulse signal synchronizing ( $A_q + 4$ ) bit position is obtained on the data line. As shown in FIG. 7, the IRW signals of $G_2$ and $G_4$ bit positions become "1" and those of other bit positions become "0" because the AND gates 23 and 24 are closed. The meaning of the IRW signal is that signal sources requesting interrupt are present in the groups of interrupt signal sources whose priority levels are second and fourth since, as predetermined the priority level of interrupt signal source $3_1$ is 2, and that of $3_2$ is 4. Thus an IRW signal as in FIG. 7(b) is transmitted to the control center via the data line during address signal transmission in the control communication as shown in FIG. 7 (a).

LSW communication is done in the following manner. First, an address between pulses A and B and a clock signal between pulses C and D as shown in FIG. 9(a) are transmitted from the control center to the address line. The address herein is assumed to be $ISW_2$ ($i = 2$). In other words, this signal is a signal for checking what signal source is generating an interrupt request whose priority level is second. This signal is applied to each station whereby the units $4b_1$, $4b_2$, $4b_3$ and $4b_4$ generate signals respectively, shown in FIGS. 12(b)-(e). The signal in FIG. 12 (e) is generated only on the line whose priority level is second. For example, this signal of FIG. 12 (e) is applied to the terminal LSW2 in FIG. 13. The clock pulse of FIG. 12 (b) is supplied to the counter 412 wherein only the pulses between the start pulse C and end pulse D are counted. When the count value reaches 1, the decoder $B_1$ delivers a pulse to the AND gate This AND gate is receiving the interrupt signal from the preserving circuit 31 and the signal of FIG. 12 (e) from LSW2. Therefore, the pulse from $B_1$ is passed through the gate 21' and sent out over the data line via the OR gate 3. As a result, a pulse having the same timing as in the $B_1$ bit position of the clock signal of the address line remains on the data line 52. When the counter 412 counts 3, 5 and $\nu - 1$, the AND gates 22', 23' and 24' receive pulses from $B_3$, $B_5$ and $B_{\nu-1}$ respectively. In this state, no signal is supplied to LSW 4, LSW6 and LSW8 and, therefore, the gates 22', 23' and 24' give no output. Considering only the station $4_1$, only the data signal having the same timing as in the $B_1$ bit position of the clock signal as in FIG. 9 (c) is "1" and others are "0".

The bit position of LSW$i'$ signal corresponds in one to one relationship to an interrupt signal source having an $i'$ th priority level in the process field. When there are provided No. 1 to No. $\nu$ interrupt signal sources whose priority level is 2, the control center will be informed that No. 1 signal source is requesting an interrupt since $i'$ is as 2 in this example.

Similarly, when an interrupt request is made by the signal $I_{25}$ of the No. 5 interrupt signal source of the group with priority level 2, which group belongs to another station, a signal appears on the data line 52 at the same time as in the $B_5$ bit position.

In the foregoing manner, the interrupt signal source which is requesting an interrupt can be known in the control center through LRW and LSW communication.

Functions of Control Center

As shown in FIG. 14, the control center 1 has a processing unit 11, a central output unit 12 and a central input unit 13. The output unit 12 comprises a clock generator C, an address memory unit 1c, an address signal transmitter unit $1a_1$ and a data signal transmitter $1a_2$. The clock pulse from the clock signal generator C is supplied to the address signal transmitter unit $1a_1$. This signal is used as a clock when transmitting a manipulated signal over the data line, and also as a clock for transmitting a clock signal and address signal over the address line. The data transmitter unit $1a_2$ is operated to synchronize the manipulated signal from the processing unit 11 with the clock signal and to transmit it over the data line 52. The address signal transmitter unit $1a_1$ is operated to synchronize the address signal from the address memory unit Ic or the address signal from the processing unit 11 with the clock pulse according to the instruction from the processing unit and to transmit the address signal over the address line 51. This transmitter unit $1a_1$ also transmits the clock signal to the address line.

The central input unit 13 comprises a data signal input unit $1b_2$ an address signal input unit $1b_1$ and a recognizing unit 1d. The data signal input unit $1b_2$ receives the sensor signal in the control communication or the IRW signal and LSW signal in the interrupt communication. These input signals are delivered to the processing unit 11 and the IRW signal is applied to the recognizing unit $2d$. The address signal input unit $1b_1$ receives signals transmitted through the address line and transmits these signals to the processing unit 11. The address signal input unit $1b_1$ generates from the received address signals a variety of signals necessary for data signal communication. For example, the address signal input unit $1b_1$ provides a clock, thereby controlling the data signal input unit $1b_2$. To decode the data signal received by the data signal input unit $1b_2$ to know about interrupt data and address, it is necessary to supply this input unit with the data from the address signal input unit $1b_1$ or the data from the address signal output unit $1a_1$. The unit $1d$ checks whether the signal IRW received by the data signal input unit $1b_2$ is requesting an interrupt, and sends the resultant data to the processing unit 11.

1. Function of Central Output Unit

FIG. 15 shows a concrete example of central output unit 12, wherein the data output unit $1a_2$ comprises a drive circuit $1a_{21}$ for transmitting a data signal over a data line 52 , and a manipulated signal memory unit $1a_{22}$ for temporarily storing the manipulated signal which is sent from the processing unit 11 during manipulated signal transmission in the control communication. The address signal output unit $1a_1$ comprises a drive circuit $1a_{11}$ for transmitting an address signal over the address line 51, an address signal memory unit $1a_{14}$ for temporarily storing the address signal received from the processing unit 11, a communication start control unit $1a_{13}$ for controlling the start of each communication, and a clock signal memory unit $1a_{15}$ for storing the clock signal.

The signal control unit $1a_{12}$ is operated to derive a manipulated signal from the manipulated signal memory unit $1a_{22}$ according to the signal generated from the communication start control unit $1a_{13}$, or to derive signals from the address signal memory unit or address memory unit 1c, and also from the clock signal memory unit $1a_{15}$ and to apply these signals to the address signal output unit $1a_{11}$. These control operations are synchronized with the signal from the clock signal generator C.

2. Operation of Central Output Unit.

When the processing unit 11 makes a request for data communication, the communication start control unit $1a_{13}$ delivers a communication start instruction to the signal control unit $1a_{12}$ via line (i). The processing unit 11 sends the address signal of the manipulated signal to the address signal memory unit $1a_{14}$ , and a manipulated signal to the manipulated signal memory unit $1a_{22}$ , to let these units store the given signals. At the same time, the processing unit makes a communication request to the communication start control unit $1a_{13}$ for data transmission. By this, the control unit $1a_{13}$ delivers immediately a data transmission start instruction to the signal control unit $1a_{12}$ via line (j). Upon receiving this instruction, the control unit $1a_{12}$ sends the address signal output unit $1a_{11}$ a start pulse as shown by A in FIG. 6 (a). Then, the control unit $1a_{12}$ takes out the address signal which has been temporarily stored in the address signal memory unit $1a_{14}$ , and sends this signal to the output unit $1a_{11}$ . ( This signal corresponds to $A_1$ through $A_n$ in FIG. 6 (a)). The control unit $1a_{12}$ sends out an end pulse indicated by B in FIG. 6 (a) and a start pulse C, derives a clock signal from the clock signal memory unit $1a_{15}$, supplies this signal to the address signal output unit $1a_{11}$ and then sends out an end pulse D. At the same time, the control unit $1a_{12}$ derives a stored manipulated signal from the manipulated signal memory unit $1a_{22}$, synchronized with the clock signal, and supplies this signal to the data signal output unit $1a_{21}$ . As a result, a pulse train as in FIG. 6 (a) is transmitted from the address signal output unit $2a_{11}$ to the address line 51, and a pulse train as IN FIG. 6 (c) is sent out from the data signal output unit $1a_{21}$ to the data line 52.

The interrupt communication, as described above, is performed in such manner that a clock as in FIG. 6 (b) is formed from the signal on the address line whereby a signal IRW is transmitted over the part II where no data signal is present, under the state that the signals as shown in FIG. 6 (a) and (c) are being transmitted over the address line 51 and data line 52, respectively. To perform IRW communication under the condition that no control communication is done from the processing unit 11, the start control unit $1a_{13}$ delivers the communication instruction of IRW transmission through the line (k) using a psuedo address. Upon receiving this instruction, the signal control unit $1a_{12}$ takes out the psuedo address signal from the address memory unit $1c$ and sends this signal in the form as in FIG. 8 to the address line 51. Based on this signal, each station is able to deliver an IRW signal as in FIG. 8(b).

For the communication of LSW, the processing unit 11 sends a communication request to the start control unit $1a_{13}$. At the same time, the address of $LSW_i$ is supplied to the memory unit $1a_{14}$. Upon this operation, the start control unit $1a_{13}$ delivers a communication start instruction to the signal control unit $1a_{12}$ through the line (i). By this, the signal control unit $1a_{12}$ takes out the address from the memory unit $1a_{14}$ and sends out this signal from the signal output unit $1a_{11}$ to the address line 51.

3. Function of Central Input Unit

FIG. 16 shows an example of input unit comprised in the control center.

The signal from the address line 51 is received by the address signal receiving circuit $1b_{11}$ and then applied to the circuits $1b_{12}$, $1b_{13}$ and $1b_{14}$. The circuit $1b_{12}$ produces a clock from the address signal, the circuit $1b_{13}$ extracts the start pulse and end pulse A, B, C and D in the address signal, and the circuit $1b_{14}$ discriminates between the address signal system and clock signal system. These circuits are formed in the same way as $4b_1$ through $4b_3$ in FIG. 11. The reference $1b_{15}$ denotes a bit position recognizing unit functioning similar to the unit 40 shown in FIG. 13. This unit $1b_{15}$ recognizes the bit position $A_1$, $A_2$, $A_3$, . . . $A_u$ and $B_1$, $B_2$, $B_3$ . . . $B_v$ of the address signal and clock signal and generates a timing signal on the lines (f), (g) and (h) according to the recognized result.

The data signal input unit $1b_2$ comprises a circuit $1b_{21}$ for receiving the data signal, a shift register $1b_{22}$, an AND gate $1b_{24}$, and a holding register $1b_{23}$. The shift pulse of the shift register $1b_{22}$is a clock pulse provided by the bit position recognizing circuit $1b_{15}$. The content of the shift register $1b_{22}$ is given directly to the processing unit 11 in case of LSW or sensor signal, or supplied to the holding register $1b_{23}$ by way of AND gate $1b_{24}$ in case of IRW signal. More specifically, when an LSW or sensor signal is written into the shift register $1b_{22}$, the recognizing unit $1b_{15}$ delivers a write end signal to the line (h), to make the processing unit read the signal. The write end signal sent through the line (h) can be formed, for example, by the end pulse D. When an IRW signal is written into the shift register $1b_{22}$, the write end signal is applied to the AND gate $1b_{24}$ through the line (f). By this, the AND gate $1b_{24}$ opens for the period the content of the register is read from the holding register $1b_{23}$. The write end signal of IRW , sent through the line (f) can be formed, for example, by the end pulse B. The circuit $1d$ checks whether "1" group data is present in the IRW signal which has been stored in the holding register $1b_{23}$. If $G_1 + G_2 + . . . . G_l = 0$, its content is supplied to the processing unit 11. At the same time, the address signal output unit $1a_1$ is informed of that "1" group data was present in IRW , and thus, the next communication is determined. For this operation, a pulse such as, for example, the end pulse B is supplied as the timing signal from the recognizing unit $1b_{15}$ through the line (g).

4. Operation of Central Input Unit

The functions of central input unit have been specifically described above, and therefore, its operational features will become apparent from the following brief description.

To receive the sensor signal in the control communication, the receiving circuit $1b_{21}$ receives a signal as in FIG. 6 (c) from the data line 52, and the receiving circuit $1b_{11}$ receives a signal as in FIG. 6 (a) from the address line 51. The bit position recognizing unit $1b_{15}$ produces a clock as in FIG. 6 (b) from the signal given to the circuit $1b_{11}$, and sends this clock to the shift register $1b_{22}$ to let the shift register $1b_{22}$ store data (c) temporarily. When the recognizing unit $1b_{15}$ detects the end pulse D, the recognizing unit $1b_{15}$ sends a signal to the processing unit 11 through the line (h). By this, the processing unit 11 reads the shift register content.

When receiving IRW in the interrupt communication, the receiving circuit $1b_{11}$ receives a signal as in FIG. 8 (a), and $1b_{21}$ a signal as in FIG. 8 (b), or otherwise the receiving circuit $1b_{11}$ receives a signal as in FIG. 7 (a), and $1b_{21}$ a signal as in FIG. 7 (b). Upon detecting the end pulse B, the recognizing unit $1b_{15}$ opens the gate $1b_{24}$ and transfers the content of $1b_{22}$ to the holding register. When "1" is found present in IRW this data is supplied to the processing unit 11 and also to the address output unit $1a_1$, and thus the next LSW communication is performed.

For the communication of LSW , the data receiving circuit receives a signal of LSW as in FIG. 9 (c), instead of the data of sensor signal as in FIG. 6 (c). Other operation of the central input unit itself is the same as operation for receiving the sensor signal.

A concrete example of the system of this invention has been described in detail. The invention is not limited to this embodiment, but various modifications thereof may be made, for example:

1. In the foregoing embodiment, the central input/output units take the control of IRW communication by psuedo address, and the central processing unit takes the control of LSW communication. Instead, the two units may take reverse parts, or the two parts may be taken care of by the central processing unit or by the input/output units. When the central input/output units does the two controls, it is necessary to provide a signal line from $1d$ to $1a_1$ in FIGS. 14, 15 and 16.

2. In the foregoing embodiment, the transmission line is formed into a loop as shown in FIG. 5. Instead, the transmission line may be formed straight wherein the signal sent from the control center to the station and that sent from the station to the control center are transmitted through a common line. Note that the transmission line in a loop makes a higher transmission speed available.

3. In the above mentioned embodiment, the transmission of interrupt signal in the process control has been described. This invention can of course be applied to one-bit signal transmission.

I claim:

1. In a signal transmission system comprising:

a plurality of groups of distributed one-bit data sources, each data source providing a first signal when in a normal first state, for providing a second signal when in an abnormal second state, each of said data sources in a group having a priority with respect to the data sources in other groups;

a control center, for receiving the address of a data source which is in an abnormal second state ;

a plurality of stations, connected to said control center via transmission lines including address and data lines and also being connected to said data sources, for forwarding said second signals to said control center from said data sources over said data line and for coupling, from said control center to said sources, address signals via said address lines;

the method of communicating between said control center and said data sources, comprising the steps of:

transmitting, from said control center to said dats sources, a first address signal having at least a clock portion made up of a plurality of bits together with a start pulse and an end pulse immediately before and after said clock bits respectively, the bit positions of said bits in said clock portion corresponding to respective groups of data sources;

transmitting over said data line , from each group of data sources to said control center, a group data signal representative of the states of said data sources in each said group, each group data signal being synchronized with the respective bit portion of said clock portion of said first address signal, said states corresponding to one of said first and second signals provided by said data sources ;

transmitting, from said control center to a group of data sources, a second address signal comprising a plurality of bits representing an address of one group including at least one data source in an abnormal state and a plurality of bits representing a clock portion, the bit positions of said clock portion corresponding to the respective data sources in said group; and transmitting, from said data sources in said group to said control center, a second data signal representative of one of said first and second signals provided by each data source in said group, said second data signal being synchronized with each bit of said clock portion in said second address signal.

2. A signal transmission system according to claim 1, wherein the method of communicating between said control center and said data sources further comprises step of decoding, at said control center, said group data signal, in accordance with the bit positions of said group data signal, to detect the data source group having the highest priority level among those groups providing at least one second signal from said data sources, so that in the third mentioned transmitting step, said second address signal, representing said group of the highest priority level, can be transmitted from said control center to the data sources.

3. In a signal transmission system including: a plurality of groups of interrupt signal sources, each of which provides one-bit data represented by a first signal corresponding to a normal first state of a signal source and a second signal corresponding to an abnormal second state of a signal source, said groups being distributed according to priority levels of interrupt requests; a plurality of controlled signal sources, distributed in a process field, from which sensor signals corresponding to process variables are generated; a control center for detecting the address of a signal source requesting an interrupt from among said interrupt signal sources, performing system control functions, processing sensor signals and transmitting the necessary manipulative signals to said control signal sources for executing process functions; a plurality of stations coupled to said control center, said interrupt signal sources and said controlled signal sources; and a transmission line having an address line and a data line connected between said stations and said control center; the method of communicating between said control center and said sources, so as to ensure interruption of said system operation in the event of a malfunction during the process in which said controlled signal sources are utilized, comprising the steps of:

transmitting, from said control center over said address line to said stations, a first address signal having a plurality of bits making up an address field representative of the address of one controlled signal source and a plurality of bits making up an clock field ;

transmitting, from a station over said data line to said control center, a first interrupt data signal representative of a group of interrupt signal sources having a specified priority level, said interrupt data signal being synchronized with the bit positions of said address field;

transmitting a sensor signal from said controlled signal source over said data line to said control center and a manipulative signal from the control center over said data line to said controlled signal source, said sensor signal and manipulated signal being synchronized with the bit positions of said clock field;

transmitting, from said control center over said address line to the group of interrupt signal sources requesting an interrupt, a second address signal comprising an address field made up of a first plurality of bits and a clock field made up of a second plurality of bits, the bits of said clock field corresponding to the respective one-bit data sources of said group of interrupt signal sources; and transmitting, from said requesting group over said data line to said control center, a second interrupt data signal representative of each data source in said group providing said second signals, said second interrupt signal being synchronized with said clock field in said second address signal.

4. A signal transmission system according to claim 3, wherein the method of communicating between said control center and said interrupt signal sources further comprises step of decoding, at said control center, said first interrupt data signal in accordance with the bit positions of said first interrupt data signal to detect the interrupt signal source group having the highest priority level among those groups providing at least one second signal from said interrupt sources, so that, in the fourth mentioned transmitting step, said second address signal representing said group of the highest priority level can be transmitted from the control center to the interrupt signal sources.

5. A signal transmission system comprising:

a plurality of groups of interrupt signal sources, each of which provides one-bit data represented by a first signal corresponding to a normal first state of a signal source and a second signal corresponding to an abnormal second state of a signal source, said groups being distributed according to priority levels of interrupt requests;

a plurality of controlled signal sources, distributed in a process field, from which sensor signals corresponding to process variables are generated;

a control center for detecting the address of a signal source requesting an interrupt from among said interrupt signal sources, performing system control functions, processing sensor signals and transmitting the necessary manipulative signals to said controlled sources for executing process functions;

a plurality of stations coupled to said control center, said interrupt signal sources and said controlled signal sources;

a transmission line having an address line and a data line connected between said stations and said control center; and means for transmitting address and data signals between said control center and said stations over said respective address lines and data lines ;

wherein said control center includes means for generating a first address signal having a first plurality of bits making up an address field representative of the address of a controlled signal source associated therewith and a second plurality of bits making up a clock field;

each of said stations includes means, responsive to said first address signal, for generating a first interrupt data signal, representative of a group of interrupt signal sources having a specified priority level, said interrupt data signal having a third plurality of bits corresponding to the groups of data sources providing said second signals and being synchronized with said first plurality of bits in the address field of said first address signal;

said control center further includes means, responsive to said first interrupt data signal transmitted thereto over said transmission line, for generating a second address signal comprising an address field made up of a fourth plurality of bits and a clock field made up of a fifth plurality of bits, the bit positions of said fifth plurality of bits corresponding to said one-bit data sources in said groups of said interrupt signal sources; and said stations also include means, responsive to said second address signal, for generating a second data signal having a sixth plurality of bits, each of which is representative of a respective data source of said plurality of data sources within said group, said second data signal having each bit positioned synchronized with a respective bit position within the clock field of said second address signal.

6. A system according to claim 5, wherein said control center comprises a central processing unit, a central input unit coupled therewith for receiving data signals from said stations, and a central output unit for transmitting said address signals to said stations.

7. A system according to claim 6, wherein each station includes an address signal output unit, coupled to said address line, for receiving said address signals, an address decoder connected to the output of said address signal output unit for decoding said address signals into respective interrupt and controlled signal source access signals, and a data signal output unit and a data signal input unit coupled to said data line and said sources for transferring data therebetween.

8. A system according to claim 7, wherein each of said stations further includes a source control unit coupled between said address decoder , said data signal input and output units and said sources , for transferring data and address signals therebetween.

9. A system according to claim 7, wherein said address decoder comprises a clock generator circuit, coupled to said address signal output unit, for generating a plurality of clock field bits from said address signal bits in said address signal, a recognizing circuit, coupled to said address signal output unit, for identifying the beginning and termination of address field bits and for providing an output signal representative thereof, a discriminating circuit, responsive to the output of said address signal output unit for generating a signal representative of the duration of an address field, and a decoding circuit, responsive to the output of said address signal output unit, for enabling said control unit for the duration of a clock field signal.

10. A system in accordance with claim 9, wherein each of said stations further includes a source control unit coupled between said address decoder, said data signal input and output units and said sources for transferring data and address signals therebetween.

11. A system according to claim 10, wherein said source control unit comprises respective control circuits each connected to a number of interrupt data sources and controlled signal sources and responsive to the outputs of each of the circuits in said address decoder for accessing said sources in dependence upon the address thereof as decoded by said address decoder, and a control unit output gating circuit responsive to the output of each of said respective control circuits for transferring said first and second data signals provided by said one-bit sources to said signal output unit for transmission over said data line to said central input unit of said control center.

12. A system in accordance with claim 11, wherein the output of said data signal input unit is coupled only to the one of said control unit control circuits for accessing said controlled signal sources.

13. A system according to claim 11, wherein the control unit control circuit for accessing said one-bit data interrupt signal sources comprises:

a first plurality of interrupt generating status preserving circuits respectively coupled to the outputs of each of said interrupt sources, first and second pluralities of AND gates, one input of each of said first and second pluralities being connected to the output of a respective interrupt generating status preserving circuit, the output of each of said AND gates being connected to an output OR circuit;

a counter-decoder circuit, responsive to the outputs of said clock generator circuit, said recognizing circuit and said discriminating circuit, for providing a plurality of pulse position outputs corresponding to the bit positions in said address and clock fields in an address signal, the outputs corresponding to the address bit field positions being connected to respective ones of said first plurality of AND gates, said outputs corresponding to clock field bit positions being connected to respective inputs of said plurality of AND gates, and wherein each of said second plurality of AND gates is connected to a corresponding priority level output of said decoding circuit.

14. A system in accordance with claim 6, wherein said central input unit comprises a data input unit and an address input unit, coupled to said transmission lines and to said central processing unit, and a recognizing unit coupled to said data input unit, said processing unit and having its output connected to said central output unit.

15. A system according to claim 14, wherein said central output unit comprises a clock generator, an address memory unit and a pair of transmitters for address and data signals, responsive to said processing unit and said clock generator for transmitting address and process control data signals to said station.

16. A system according to claim 14, wherein said address input unit comprises an address receiver circuit connected to said address line, a clock producing circuit, a pulse producing circuit and a discriminating circuit, connected to the output of said address receiver circuit, and being coupled to a bit position recognizing unit, for decoding the address of a signal source providing interrupt signals.

17. A system according to claim 16, wherein said data input unit comprises a data receiver circuit coupled to said data line, a shift register connected thereto and to said bit position recognizing unit of said address signal input unit, a holding register logically coupled to the output of said shift register for transferring the output thereof to said processing unit.

18. A system according to claim 17, wherein each station includes an address signal output unit coupled to said address line for receiving said address signals, an address decoder connected to the output of said address signal output unit for decoding said address signals into respective interrupt and controlled signal source access signals, and a data signal output unit and a data signal input unit coupled to said data line and said sources for transferring data therebetween.

19. A system in accordance with claim 18, wherein said address decoder comprises a clock generator circuit, coupled to said address signal output circuit, for generating a plurality of clock field bits from said address signal bits in said address signal, a recognizing circuit, coupled to said address signal output unit for identifying the beginning and termination of address field bits and for providing an output signal representative thereof, a discriminating circuit, responsive to the outputs of said address signal output unit for generating a signal representative of the duration of an address field and a decoding circuit, responsive to the output of said address signal output unit for enabling said control unit for the duration of a clock field signal.

20. A system according to claim 19, wherein each of said stations further includes a source control unit coupled between said address decoder, said data signal input and output units and said sources for transferring the data and address signals therebetween.

21. A system in accordance with claim 20, wherein said source control unit comprises respective control circuits, each connected to a number of interrupt data sources and controlled signal sources and responsive to the outputs of each of the circuits in said address decoder for accessing said sources in dependence upon the address thereof as decoded by said address decoder, and a control unit output gating circuit responsive to the outputs of each of said respective control circuits for transferring said first and second data signals provided by said one-bit sources to said signal output unit for transmission of said data line to said central input unit of said control center.

22. A system in accordance with claim 21, wherein the control unit control circuit for accessing said one-bit data interrupt signal sources comprises a first plurality of interrupt generating status preserving circuits respectively coupled to the outputs of each of said interrupt sources, first and second pluralities of AND gates, one input of each of which is connected to the output of a respective interrupt generating status preserving circuit, the outputs of each said AND gates being connected to an output OR circuit, a counter-decoder circuit responsive to the outputs of said clock generator circuit, said recognizing circuit and said discriminating circuit for providing a plurality of pulse position outputs corresponding to the bits positions in said address and clock fields in an address signal, the outputs corresponding to address field bit positions being connected to respective ones of said first plurality of AND gates, said outputs corresponding to clock field bit positions being connected to respective inputs of said second plurality of AND gates, and wherein each of said second plurality of AND gates is connected to a corresponding priority level output of said decoding circuit.

* * * * *